(12) United States Patent
Hansen et al.

(10) Patent No.: US 9,102,567 B1
(45) Date of Patent: *Aug. 11, 2015

(54) ENGINEERED PORTLAND CEMENT INCORPORATING SCMS AND METHODS FOR MAKING SAME

(71) Applicant: Roman Cement, LLC, Bountiful, UT (US)

(72) Inventors: Andrew S. Hansen, Bountiful, UT (US); John M. Guynn, Salt Lake City, UT (US)

(73) Assignee: ROMAN CEMENT, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/906,201

(22) Filed: May 30, 2013

Related U.S. Application Data

(63) Continuation of application No. PCT/US2011/062739, filed on Nov. 30, 2011, and a continuation-in-part of application No. 13/357,121, filed on Jan. 24, 2012, and a continuation-in-part of application No. 13/798,756, filed on Mar. 13, 2013, now Pat. No. 8,551,245.

(60) Provisional application No. 61/418,264, filed on Nov. 30, 2010, provisional application No. 61/429,138, filed on Jan. 2, 2011, provisional application No. 61/435,764, filed on Jan. 24, 2011, provisional application No. 61/450,596, filed on Mar. 8, 2011, provisional application No. 61/533,269, filed on Sep. 12, 2011, provisional application No. 61/549,742, filed on Oct. 20, 2011, provisional application No. 61/549,748, filed on Oct. 20, 2011.

(51) Int. Cl.
C04B 7/04 (2006.01)
F17D 3/01 (2006.01)
C04B 7/52 (2006.01)
C04B 20/00 (2006.01)

(52) U.S. Cl.
CPC ...... *C04B 7/04* (2013.01); *F17D 3/01* (2013.01); *C04B 7/527* (2013.01); *C04B 20/0088* (2013.01)

(58) Field of Classification Search
CPC ...... C04B 28/02; C04B 28/04; C04B 20/008; C04B 7/02; C04B 2235/5436; C04B 7/527
USPC .................. 106/636, 756, 757, 816
See application file for complete search history.

(56) References Cited

U.S. PATENT DOCUMENTS 3,447,937 A * 6/1969 Hersey et al. ............ 106/735
3,615,787 A * 10/1971 Teramoto et al. ........ 106/733
3,689,295 A 9/1972 Hersey et al.
5,121,795 A * 6/1992 Ewert et al. ............. 166/292
5,346,012 A 9/1994 Heathman et al.
5,383,521 A * 1/1995 Onan et al. .............. 166/293
5,776,244 A * 7/1998 Ahrens .................... 106/737
2006/0201395 A1* 9/2006 Barger et al. ............ 106/705
2007/0266906 A1 11/2007 Garcia

FOREIGN PATENT DOCUMENTS

WO    WO 2007053398 A1 *  5/2007
WO       2011-103371         8/2011

OTHER PUBLICATIONS

Celik, I.B. "The effects of particle size distribution and surface area upon cement strength development". Powder Technology. 2009. 188 pp. 272-276.*
Bentz, Dale P.; Ferraris, Chiara F.; Filliben, James J. "Optimization of Particle Sizes in High Volume Fly Ash Blended Cement". NIST. Feb. 2011.*
Erdogdu, K.; Turker, T. "Effect of fly ash particle size on strength of Portland cement fly ash mortars". Cement and Concrete Research. vol. 28, No. 9. pp. 1217-1222. 1998.*
Cros et al.: "Image Analysis of Fly Ash in the Characterization of the Shape of Grains," 1995 [Retrieved May 15, 2012]. Retrieved from http://journals.cambridge.org/download.php?file=%2FOPL%2FOPL370%2FS1946427400421858a.pdf&code=c5c0fad6487a292a968140bc4db80943.
Slmetric, Retrieved May 15, 2012, Retrieved from http://www.simetric.co.uk/si_materials.htm.
"Effect of Cement Characteristics on Concrete Properties," Portland Cement Association, Oct. 26, 2007, http://web.archive.org/web/20071026182145/http://www.cement.org/tech/cct_cement_characteristics.asp.
U.S. Appl. No. 13/308,535, May 23, 2012, Office Action.
U.S. Appl. No. 13/308,535, Jan. 11, 2013, Office Action.

* cited by examiner

*Primary Examiner* — Kaj K Olsen
*Assistant Examiner* — Karam Hijji
(74) *Attorney, Agent, or Firm* — Workman Nydegger

(57) ABSTRACT

Engineered cements are described that include an engineered clinker fraction designed for use with one or more supplementary cementitious material ("SCM") fractions. The engineered clinker fraction has a narrow particle size distribution ("PSD") with a relatively high tricalcium silicate ("$C_3S$") content as compared to traditional ordinary Portland cement ("OPC"). The high $C_3S$ content and narrow PSD provide desired reactivity and set time when combined with the one or more SCMs. The clinker fraction may be combined with one or more ultrafine SCM fractions and/or one or more coarser SCM fractions to achieve a desired wide particle size distribution. By engineering the chemistry and the particle size of the clinker fraction and the SCM fraction to work together, the engineered cements can have superior packing density, water demand, reactivity, set time, sulfate resistance, and strength development as compared to conventional OPC-SCM blends.

19 Claims, No Drawings

ENGINEERED PORTLAND CEMENT INCORPORATING SCMS AND METHODS FOR MAKING SAME

CROSS REFERENCE TO RELATED APPLICATIONS

This application is a continuation of International Patent Application No. PCT/US2011/062739, filed Nov. 30, 2011, which claims the benefit of U.S. Provisional Application No. 61/418,264, filed Nov. 30, 2010 and U.S. Provisional Application No. 61/429,138, filed Jan. 2, 2011, the disclosures of which are incorporated herein in their entirety; this application is also a continuation-in-part of U.S. patent application Ser. No. 13/357,121, filed Jan. 24, 2012, and entitled "METHODS AND SYSTEMS FOR MORE EFFICIENT UTILIZATION OF CEMENT AND SCMs," which claims the benefit of U.S. Provisional Application No. 61/435,764, filed Jan. 24, 2011; U.S. Provisional Application No. 61/450,596, filed Mar. 8, 2011; U.S. Provisional Application No. 61/533,269, filed Sep. 12, 2011; U.S. Provisional Application No. 61/549,742, filed Oct. 20, 2011; and U.S. Provisional Application No. 61/549,748, filed Oct. 20, 2011, the disclosures of which are incorporated herein in their entirety; this application is also a continuation-in-part of U.S. patent application Ser. No. 13/357,121, filed Mar. 13, 2013, the disclosure of which is incorporated herein in its entirety.

BACKGROUND

1. Field of the Invention

The invention is generally in the field of hydraulic cement and concrete.

2. Relevant Technology

Supplementary Cementitious Materials ("SCMs"), such as fly ash, slag, natural pozzolans, and limestone, are often used to replace a portion of Portland cement in concrete. SCMs can yield improved concrete with higher durability, lower chloride permeability, reduced creep, increased resistance to chemical attack, lower cost, and reduced environmental impact. Reactive SCMs such as pozzolans react with calcium hydroxide released during cement hydration. Non-reactive SCMs such as limestone can serve as nucleation sites and/or as a filler to reduce water demand.

Portland cement, sometimes referred to as "cement clinker" or "OPC" (acronym for "ordinary Portland cement"), is the most expensive component of concrete. The manufacture of cement clinker contributes an estimated 5-7% of all manmade $CO_2$. There is a long-felt but unmet need to reduce cement clinker (or "clinker") consumption. There have been numerous academic conferences and publications dedicated to the concept of substituting a portion of clinker with SCM. Despite an oversupply of low cost SCMs, the industry has failed to overcome technical hurdles to more effectively utilizing SCMs. This failure, after years of research and discussion, to fully utilize readily available and less expensive waste SCMs to reduce clinker consumption, even though doing so would reduce cost and benefit the environment, shows that conventional practices for utilizing SCMs are inadequate.

Cement manufacturers almost universally produce OPC having a relatively broad particle size distribution ("PSD") (e.g., between about 1-60 µm) and a particular chemistry in an attempt to strike a balance between the competing effects and demands of reactivity, rate of strength development, water demand, inter particle spacing, paste density, porosity and autogenous shrinkage. Cement manufacturers optimize OPC for use with itself, without regard to how OPC behaves when blended with SCMs.

SMCs are considerably less reactive than clinker and therefore delay set times and retard strength development by dilution. Although OPC-SMC blends can approach the strength of 100% OPC at later ages (>56 days), early (1-7 day) strength can be severely impacted when more than about 10-20% of OPC is replaced with SCM. Retardation of strength development and delays in set time limit SCM usage in concrete and are the reason why millions of tons of SCMs remain unused. The conventional solution is to "fix" SCMs to make them more reactive, e.g., by intergrinding with OPC or independently grinding them more finely than OPC. Neither "solution" has solved the problem of SCM underutilization.

SUMMARY

Engineered cementitious blends ("engineered cements") disclosed herein include two fractions: (i) an engineered clinker fraction and (ii) one or more SCM fractions. The engineered clinker fraction has a narrow PSD cement clinker with a relatively high tricalcium silicate ("$C_3S$") content and/or tricalcium aluminate ("$C_3A$") content and a correspondingly lower dicalcium silicate ("$C_2S$") content as compared to traditional OPC clinker. The high $C_3S$ content and narrow PSD provide a desired reactivity and set time when combined with the one or more SCMs. The clinker fraction may be combined with one or more finer SCM fractions and/or one or more coarser SCM fractions to achieve a desired wide particle size distribution. By engineering the chemistry and the particle size of the clinker fraction and the SCM fraction to work together, the engineered cements can have superior water demand, reactivity, set time, sulfate resistance, and strength development as compared to conventional OPC-SCM blends. Examples of narrow PSD cements, cement-SCM blends containing such cements, and methods for their manufacture and use are disclosed in WO 2011/130482, published Oct. 20, 2011, which is incorporated by reference.

In one embodiment the present invention is directed to a ground clinker having a high $C_3S$ content and a narrow PSD. The $C_3S$ content may be at least 50%, 55%, 57%, 59%, 60%, 61%, 63%, 65%, 67%, 70%, 75%, 80%, or 85% by weight. To achieve the higher percentages of $C_3S$ it may be useful to use a flux (e.g., fluoride flux) in the kiln. Although not required, it is generally advantageous to engineer the clinker fraction to include as much $C_3S$ as possible. The raw materials and kiln operating parameters often limit the maximum $C_3S$ content to within a range from 50%-85%.

Engineered cements are engineered to maximize utilization of $C_3S$ in the clinker fraction. The $C_3S$ mineral is generally the most costly component of Portland cement to produce in terms of energy consumption and $CO_2$ output. However, $C_3S$ is the primary component that gives modern cement its early strength development characteristics and early set times. Thus, by engineering the clinker fraction and SCM fractions to maximize utilization of $C_3S$, the engineered cements achieve the best performance for a given energy consumption and $CO_2$ output.

Maximizing $C_3S$ utilization is achieved in part by grinding the clinker to have a narrow PSD with minimal cement fines. In one embodiment, the d1, d5, d10, or d15 of the clinker fraction is greater than 2.0 µm, 2.5 µm, 3.0 µm, 5.0 µm, 7.5 µm or 10.0 µm and/or the d99, d95, d90, or d85 is less than 35 µm, 30 µm, 25 µm, 20 µm, or 15 µm. These narrow PSDs can be economically achieved in a vertical roller mill configured to produce narrow PSD cements. Other techniques such as high recirculation and/or double classification in a ball mill circuit, high pressure grinding roll, or other mill can also be used.

One way in which narrow PSD clinker maximizes $C_3S$ usage is by minimizing the amount of cement that remains unhydrated in concrete. When cement is mixed with water, the cement particles dissolve at a particular rate that continually slows over hours, days, and months. In modern concrete, large cement particles (e.g., particles >40 μm) never fully hydrate. The unhydrated core merely serves as an expensive aggregate and is therefore "wasted cement." In contrast, the engineered cements of the invention minimize the amount of large clinker particles and therefore minimize the amount of "wasted $C_3S$."

The narrow PSD clinker fraction also enhances utilization of $C_3S$ by minimizing the amount of clinker fines. Clinker fines (e.g. particles <2 μm) dissolve very rapidly in hydrating cement paste as compared to large particles. This rapid dissolution quickly increases the viscosity of the cement paste and results in high water demand. Reducing the number of cement fines while still achieving a high surface area results in better water demand with the same reactivity, particularly where the fines are replaced with slower reacting and slower dissolving fine SCM particles. Due to the rate at which cement particles dissolve as compared to SCM materials, minimizing clinker fines can produce a much greater benefit as compared to minimizing SCM fines.

In addition to increased water demand, the inventors have observed that saturating the cement paste with excessive cement fines inhibits dissolution of larger clinker particles. This observation can be explained by Le Châtelier's principle, which states that if a chemical system in equilibrium experiences a change in concentration, then the equilibrium shifts to counteract the imposed change.[1] In the case of cement hydration, the rate at which silicate hydrates precipitate out of solution limits the rate at which clinker particles dissolve. When more ultrafine cement particles are present, they quickly dissolve because of their high surface area and saturate the water, which inhibits dissolution of larger clinker particles pursuant to Le Châtelier's principle. The consequence is larger clinker particles having a bigger core of unhydrated or "wasted cement" than they otherwise would in the absence of the ultrafine cement particles. Moreover, once the ultrafine particles are completely dissolved, they stop contributing to strength development (i.e., they "burn out") leaving behind large particles with a low surface area. Thus, while cement fines can create initially higher early strengths, the fines ultimately cause under utilization of $C_3S$ and produce ultimately lower overall strength.

[1] Le Châtelier's principle is a well-know principle taught in most college general chemistry courses. In general terms, Le Châtelier's principle is often used to describe the phenomenon where removing the products of a reaction in equilibrium will drive the reaction to completion. Although Le Châtelier's principle is notoriously well understood in the context of most chemical disciplines, in recent years it has rarely been used to design cement. This is quite surprising given the fact that Le Châtelier was a consultant for the French cement company Lafarge and wrote his doctoral thesis on cement hydration: "Recherches expérimentales sur la constitution des mortiers hydrauliques." (Experimental research on the composition of hydraulic mortars).

The current practice in the industry to avoid rapid dissolution of cement fines is to (i) avoid producing cement fines by grinding the cement more coarsely (e.g., ASTM Type I/II cement which often has a d90>45 μm and a d10<2 μm), or (ii) use a water reducer when using finely ground cement (e.g., ASTM Type III cement which often has a d90>25 μm and a d10<1 μm). In this latter case, high range water reducers allow the paste to flow using less water, which increases strength. However, the increased strength comes from using less water, not better utilization of the $C_3S$. In fact, water reducers inhibit cement hydration and retard setting. Thus, neither of the foregoing "solutions" utilizes more of the $C_3S$ content and therefore each result in waste cement and/or undesirable tradeoffs in performance.

In contrast, the present invention uses narrow PSD clinker to minimize the need for high range water reducers while still creating a relatively high surface area cement. Since SCMs do not dissolve as rapidly as clinker, the SCMs do not compete for water in the same way that ultrafine cement does. In addition, combining the clinker fraction with fine and/or coarse SCMs mitigates poor particle packing of the narrow PSD clinker fraction, which increases overall cement paste density (thereby improving resistance to sulfate attack) and reduces water demand (thereby improving strength at a given flow).

Another benefit of using high $C_3S$ (as compared to $C_2S$) in combination with narrow PSD clinker is that the $C_3S$ dissolves more rapidly than $C_2S$. Thus, by using a higher $C_3S$ content, comparatively larger particles will more fully dissolve, which minimizes the amount of wasted clinker. Thus, high $C_3S$ allows the clinker material to be ground more coarsely while still fully hydrating the particles, which further reduces water demand and grinding costs.

In addition to using relatively high concentrations of $C_3S$, the clinker fraction may also include relatively high $C_3A$ content. The $C_3A$ content is selected to achieve a desired temperature in the hydrating concrete. Since the engineered cement minimizes the amount of clinker used, the $C_3A$ content may be higher than a comparable OPC even though the engineered cement better utilizes $C_3S$ than OPC.

The clinker material can have a $C_3A$ content of at least 4.5, 5.5%, 6.5%, 7.5%, 8.5%, 9.5%, 10.5%, 11.5%, 12.5%, 15%, or 17.5%. The specific amount of $C_3A$ for any given cement will depend in part on the raw materials available to make the clinker and the SCMs being mixed with the clinker material. In general, the $C_3A$ content (whether provided by the SCM or clinker fraction) is optimized to maximize performance of the $C_3S$ in the engineered cement. Similarly the sulfate (e.g., gypsum) content is selected to maximize performance of the $C_3A$ in the engineered cement (not the individual fractions.

As mentioned, the engineered clinker fraction is combined with one or more SCMs to create the engineered cement. The SCM may be an ultrafine SCM that is finer than the hydraulic cement fraction, a coarser SCM that is coarser than the clinker fraction, a broad distribution SCM that has a broader PSD than the clinker fraction, or a combination of these. In each case, the SCM increases the particle packing density of the cement while diluting out the hydraulic cement fraction to produce engineered cement with a desired particle size distribution and reactivity. In one embodiment, the engineered cements may have at least 10%, 15%, 20%, 25%, 30%, 50%, 60%, or even 70% by volume or mass of SCM. While the present invention can be used to make engineered cements with as little as 10%-25% SCM, it is preferable to use 30% or more SCM to substantially reduce clinker usage and offset costs associated with engineering two or more separate cement fractions.

Although not required, it may be advantageous for the engineered cement to include at least one non-reactive ultrafine SCM such as micronized limestone or quartz. The non-reactive ultrafine SCM serves as a nucleating agent for silicate hydrates, which increases the rate at which silicate hydrates precipitate out of solution. According to Le Châtelier's principle, removing silicate hydrates from solution increases the rate and extent to which larger clinker particles will fully dissolve, thereby further increasing the utilization of $C_3S$. Increasing the rate at which clinker dissolves also releases more heat due to the exothermic nature of clinker hydration. Extracting more heat from a given amount of clinker reduces the need for aluminates in the cement, which allows for a correspondingly greater percentage of the clinker to be $C_3S$, which results in better utilization of the clinker fraction. In addition, accelerating dissolution allows the clinker fraction to be ground more coarsely, which reduces water demand and grinding costs.

The ultrafine SCM also increases the density of the engineered cement by filling in void spaces between the larger clinker particles. Ultrafine SCMs are particularly advantageous with narrow PSD clinker fractions because of the relatively high d10 of the clinker fraction, which tends to reduce paste density. Increased density from the ultrafine SCM improves water demand, which increases $C_3S$ hydration and improves resistance to sulfate attack by making the cement less permeable to ions.

Finally, the ultrafine SCM fraction can also accelerate set time by decreasing the pore volume of the engineered cement. When hydrating cement paste sets, it is because the growing cement crystals bridge the pores. The larger the pores, the longer it takes to bridge the pores. Thus, narrow PSD clinker fractions benefit substantially in terms of set time by reducing the pore volume using an ultrafine SCM.

Because Portland cement production is a large emitter of $CO_2$, reducing the amount of clinker used in the engineered cements while achieving the same performance substantially reduces the carbon emissions and energy consumption of the cement industry and the carbon footprint of end products that use cement (e.g., ready mix and precast concrete).

These and other advantages and features of the invention will become more fully apparent from the following description and appended claims, or may be learned by the practice of the invention as set forth hereinafter.

DETAILED DESCRIPTION

I. Hydraulic Cement Fraction

Engineered cements include at least one hydraulic cement fraction (i.e., clinker fraction) engineered for use with one or more SCMs. The terms "hydraulic cement," "cement clinker", and "clinker" as used herein, include Portland cement and similar materials that contain one or more of the four clinker minerals: $C_3S$ (tricalcium silicate), $C_2S$ (dicalcium silicate), $C_3A$ (tricalcium aluminate), and $C_4AF$ (tetracalcium aluminoferrite). Besides clinkers used to make cements within the meaning of ASTM C150 (e.g., Types I-V), white cement, calcium aluminate cement, high-alumina cement, magnesium silicate cement, magnesium oxychloride cement, oil well cements (e.g., Type VI, VII and VIII), magnesite cements, and combinations of these and other similar materials are examples of hydraulic cement. Ground granulated blast-furnace slag (GGBFS) and other slags that include one or more clinker minerals may also function as hydraulic cement. They also qualify as SCMs.

A. Particle Size Distribution of Clinker Fraction

The clinker fraction of the engineered cement may have a narrow PSD. According to one embodiment, the PSD of the cement fraction can be defined by its d10, d50 and d90, with the d10 approximating the lower PSD endpoint ("LEP"), the d90 approximating the upper PSD endpoint ("UEP"), and the d50 approximating the mean particle size ("MPS") of the PSD. In other embodiments, one or more of the d1, d5, d15, or intermediate value can be used as the approximate LEP, one or more of the d85, d95, d99, or intermediate value as the approximate UEP, and one or more of the d40, d45, d55, d60 or intermediate value as the approximate MPS.

Narrow PSD clinker fractions are typically characterized as having a spread (e.g., UEP-LEP) and endpoint ratio (e.g., UEP/LEP) that are lower than the spread and endpoint ratio, respectively, of OPC, often substantially lower. Lowering the UEP reduces the volume of unhydrated cement cores, which increases hydration efficiency. Raising the LEP improves utilization of $C_3S$ and, in conjunction with an ultrafine SCM, reduces water demand. In one embodiment, a narrow PSD clinker fraction can have a LEP that is substantially higher, and a UEP that is substantially lower, than the respective LEP and UEP of OPC (e.g., for both Fuller and Tsivilis distributions).

By way of example, as compared to Types I, II, IV and V OPC as defined by ASTM C150, at least the d10 of a narrow PSD clinker can be substantially higher than the d10, and, in most cases, the d90 of a narrow PSD clinker can be substantially lower than the d90, of these types of OPC. As compared to Type III OPC as defined by ASTM C150, at least the d10 of a narrow PSD clinker can be substantially higher than the d10, and the d90 of the narrow PSD clinker can be the same or less than the d90, of Type III OPC.

In one embodiment, the PSD of the clinker fraction can be defined by the upper and lower PSD "endpoints" UEP and LEP (e.g., d90 and MO). The PSD can also be defined by the spread or difference between UPE and LPE (e.g., "d90-d10"). In another embodiment, the PSD of the clinker fraction can be defined by the upper and lower endpoint ratio UEP/LEP (e.g., d90/d10). In yet another embodiment, the PSD can be defined by the lower median range LEP and MPS (e.g., d10 and d50). In still another embodiment, the PSD can be defined by the lower median ratio MPS/LEP (e.g., d50/d10). In another embodiment, the PSD can be defined by the upper median range MPS and UEP (e.g., d50 and d90). In yet another embodiment, the PSD can be defined by the upper median ratio UEP/MPS (e.g., d90/d50). The PSD can also be defined by any combination of the foregoing and/or using similar methodologies to increase reactivity and/or utilization of $C_3S$ and/or decrease water demand compared to OPC and conventional cement-SCM blends.

The upper endpoint (UEP) can be selected to provide a desired reactivity and/or $C_3S$ utilization in conjunction with or independent of the lower endpoint (LEP) and/or in conjunction with one or more coarser SCMs to reduce water demand and increase particle packing density. According to several embodiments, the UEP (e.g., d85, d90, d95 or d99) can be equal to or less than about 35 µm, 30 µm, 27.5 µm, 25 µm, 22.5 µm, 20 µm, 18 µm, 16.5 µm, 15 µm, 13.5 µm, 12 µm, 11 µm, or 10 µm. The lower UEP limit can be about 8 µm, 9 µm or 10 µm.

The lower endpoint (LEP) can be selected to minimize the clinker fines to maximize $C_3S$ utilization in conjunction with or independent of the upper endpoint (UEP) and/or in conjunction with one or more finer SCMs to accelerate hydration, reduce water demand, and increase density. According to several embodiments, the LEP (e.g., d1, d5, d10 or d15) can be equal to or greater than about 1.0 µm, 1.25 µm, 1.5 µm, 1.75 µm, 2 µm, 2.5 µm, 3 µm, 4 µm, 5 µm, 6 µm, 7 µm, or 8 µm. The upper LEP limit can be about 6 µm, 8 µm, 10 µm, 12 µm or 15 µm.

The UEP and LEP can also define the spread (UPE-LEP) of the hydraulic cement fraction. By way of example, depending on the UEP and LEP of the cement fraction and ability or limitations of processing equipment to produce narrow PDS cement fractions, the spread can be less than about 30 µm, 25 µm, 22.5 µm, 20 µm, 17.5 µm, 15 µm, 13 µm, 11.5 µm, 10 µm, 9 µm, 8 µm, 7 µm, 6 µm, 5 µm, or 4 µm.

In another embodiment, the ratio UEP/LEP can define a narrow PSD cement fraction having a desired reactivity and $C_3S$ utilization in conjunction with one or more SCMs. The UEP/LEP (e.g., d90/d10) of narrow PSD cement fractions can be less than the ratio of Types I-V cements as defined by ASTM C-150. According to several embodiments, the UEP/LEP can be less than or equal to about 25, 22.5, 20, 17.5, 15, 12.5, 10, 8, 6, 5, 4.5, 4, 3.5, 3, 2.5 or 2.

It will be appreciated that defining the PSD of a narrow PSD cement fraction by the ratio UEP/LEP is not limited by any particular UEP or LEP or range of particle sizes. For example, a first hypothetical narrow PSD cement having a d90 of 15 µm and a d10 of 3 µm has a UEP/LEP (i.e., d90/d10) of 5 and spread (d90-d10) of 12 µm. By comparison, a second hypothetical narrow PSD cement having a d90 of 28 µm and a d10 of 7 µm has a UEP/LEP (i.e., d90/d10) of 4 and a spread (d90-d10) of 21 µm. While the spread of the second hypothetical narrow PSD cement is greater, the UEP/LEP (i.e., d90/d10) is smaller, than those of the first hypothetical narrow PSD cement. Thus, the second hypothetical cement has a narrower PSD compared to the first hypothetical cement as defined by UEP/LEP (i.e., d90/d10) even though the spread is greater.

Additional PSD characteristics that may be used alone or together and/or in combination with the foregoing PSD characteristics of the cement fraction include: (i) a MPS (d40, d45, d55, d60) that can be less than or equal to about 25 µm, 22.5 µm, 20 µm, 18 µm, 16 µm, 15 µm, 14 µm, 13 µm, 12 µm, 11 µm, 10 µm, 9 µm, 8 µm, 7 µm, 6.5 µm, 6 µm, 5.5 µm, or 5 µm; (ii) a ratio d50/d10 can be less than or equal to 7.5, 6.5, 5.5, 5, 4.5, 4.25, 4, 3.75, 3.5, 3.25, 3, 2.75, 2.5, 2.25, 2, 1.75 or 1.5; (iii) the ratio d90/d50 can be in a range of about 1.25 to 6, about 1.5 to 5.5, about 1.75 to about 5, about 2.0 to 4.5, about 2.25 to 4.25, about 2.5 to 4.0, about 2.75 to 3.75, about 2.9 to 3.6, or about 3.0 to 3.5; (iv) a surface area of at least about 500 $m^2/kg$, or at least about 550 $m^2/kg$, or at least about 600 $m^2/kg$, or least about 650 $m^2/kg$, or at least about 700 $m^2/kg$, or at least about 800 $m^2/kg$, or at least about 900 $m^2/kg$, or at least about 1000 $m^2/kg$.

B. Chemical Composition of Clinker Fraction

The particular amount of tricalcium mineral content required to achieve similar performance as 100% OPC cements will depend on the fineness and narrowness of the PSD of the engineered clinker fraction and/or the amount and/or chemistry of the SCM fraction to be blended with the engineered clinker fraction. In general, the higher the SCM replacement level, the higher the tricalcium mineral content of the hydraulic cement fraction should be to maintain a similar reactivity as compared to OPC.

The $C_3S$ content in either the engineered cement or the clinker fraction can range between 50% and 85%. The $C_3S$ content in the engineered cement may be at least 50%, 53%, 55%, 57%, 59%, 60%, 61%, 63%, 65%, or 67%. The $C_3S$ content in the clinker fraction is preferably at least 55%, 57%, 59%, 60%, 61.5%, 63%, 64.5%, 66%, 70%, 75%, 80%, or 85%. $C_3S$ content above about 65%-70% may require the use of a flux in the kiln (e.g., fluoride flux) and can be more easily accomplished with "low alkali feed materials" as understood by those of ordinary skill.

The $C_3S$ needed to achieve proper strength development and setting can depend on both the PSD of the engineered cement and percent SCM substitution. However, because durability is less of a concern with higher concentrations of $C_3S$ (as compared to $C_3A$), the engineered hydraulic cement can include as much $C_3S$ as the raw materials and operating parameters of the kiln will reasonable allow. Generally, $C_3S$ content greater than 59%, preferably 61.5%, in the clinker material can be suitable for engineered hydraulic cements with PSDs with a d85 less than 35 µm, 30 µm, 25 µm, etc and as low as 20 vol % SCM substitution. Where SCM substitution is greater than 30 vol %, the $C_3S$ in the clinker fraction is preferably at least 57%, 59%, 61.5% or 64.5% and the d85 is preferably less than 30 µm, more preferably less than 25 µm.

The $C_3A$ content is generally more sensitive to the percent substitution than the tricalcium silicate. Thus, $C_3A$ is preferably adjusted upward and downward on a percentage basis in relation to percent SCM substitution. Generally, higher substitutions of SCM require higher $C_3A$ content for a given fineness and particular SCM. The upper limit of the $C_3A$ will depend on several factors. The $C_3A$ is generally limited to avoid excessive heat generation, false set, and/or sulfate attack, and to maximize the strength development of $C_3S$.

In the engineered cement fraction, the aluminate content is selected to achieve desired heats of hydration and sulfate resistance when blended with the SCM. Because the engineered hydraulic cements are diluted with SCM, the engineered hydraulic cements will typically include substantially more $C_3A$ than OPC designed for use without an SCM and/or without regard to SCM substitution. The $C_3A$ of the clinker material may be at least 4.5%, 5.5%, 6.5%, 7.5%, 8.5%, 9.5%, 10.5%, 12.5%, 15%, or 17.5% by wt.

Although not requires, the ratio of $C_3A$ to $C_3S$ in the engineered clinker may be greater than the $C_3A$ to $C_3S$ ratio in clinkers for 100% OPC to account for silicate hydrates contributed by the SCM fraction. In one embodiment, the ratio of $C_3S$ to $C_3A$ is less than 8, preferably less than 7.5, 7, 6.5, 6, 5.5, 5, or 4.5.

The combined amount of $C_3S$ and $C_3A$ can also be selected to provide a desired reactivity (alone or in combination with the PSD). In one embodiment, the sum of the $C_3S$ and $C_3A$ in the engineered cement clinker is greater than 73.5%, preferably at least 75%, 77%, 81%, or 85% by weight of the clinker material. Such engineered cements are particularly useful for use with at least 30 vol %, 35 vol %, or 40 vol % SCM.

The desired concentrations of $C_3S$ and/or $C_3A$ can be achieved using a single clinker fraction or two or more cement clinkers that are blended together and that have different chemistries. The use of two or more clinkers with different chemistries can be advantageous where adjusting the kiln feed is difficult or costly. Instead, the desired $C_3A$ content can be achieved by providing a first clinker with high $C_3A$ content and diluting it with a second clinker with higher $C_3S$ and lower $C_3A$. In one embodiment, the engineered cement can include first and second clinkers that differ in a mineral content of the clinker (e.g., the $C_3S$ and/or $C_3A$) by at least 1%, 2%, 3%, 4%, 5%, 6%, or 7% by weight.

The low aluminate clinker fraction to be blended with a second clinker fraction can have an aluminate content in the clinker material less than 8%, 7%, 6%, 5% or even less than 1%. The low aluminate cement clinker fraction can be alite. However, because $C_3A$ can be beneficial as a flux in some embodiments, the low aluminate cement fraction can have at least 4%, 5%, or 6% $C_3A$. The range of $C_3A$ can be a range formed from a combination of any of the foregoing upper and lower endpoints.

The high aluminate clinker fraction can have at least 6%, 8%, 10% 12%, or 14% $C_3A$ in the clinker. The maximum $C_3A$ can be selected to maximize $C_3S$. For example, the upper limit on the $C_3A$ in the high aluminate clinker may be less than 14%, 12% or 10% or be within a range of any of the foregoing upper and lower endpoints.

The clinker fraction differs from OPC by the reactivity that is produced. In one embodiment, the cement clinker fraction generates 7 day heats of hydration that exceed acceptable heats of hydration for OPC. In one embodiment, the 7 day heat of hydration of the cement fraction as measured using ASTM C186 is at least 255, 260, 275, 295, 315, or 340 kJ/kg. However, when combined with the SCM fraction, the engineered cement fractions have heats of hydration that are lower than the foregoing heats of hydration (e.g., similar to OPC).

II. SCM Fractions

The engineered clinker fraction is engineered to be combined with one or more SCM fractions. The terms "Supplementary Cementitious Material" and "SCM", as used herein, include any materials commonly understood in the industry to serve as partial replacements for Portland cement in concrete or mortar in either engineered cements or by self-blending by end users. Examples range from highly reactive materials (e.g., GGBFS), moderately reactive materials (e.g., Class C fly ash, steel slag, silica fume, activated metakaolin, metastable forms of $CaCO_3$), lower reactive materials (e.g., Class F fly ash, volcanic ash, natural pozzolans, trass, and metastable forms of $CaCO_3$), and essentially non-reactive materials and fillers (e.g., ground limestone, ground quartz, precipitated $CaCO_3$, and precipitated $MgCO_3$).

The relative amount of a particular SCM, its PSD, and chemical composition are engineered in conjunction with the other SCMs and clinker fractions to maximize $C_3S$ utilization and/or minimize the cost of the engineered cement. Preferably the SCM fraction(s) are selected to mitigate the detrimental effects of the narrow PSD clinker fraction(s). The selection of the SCM fractions may be carried out so as to maximize $C_3S$ utilization by (i) diluting the clinker fraction, (ii) increasing particle packing density of the engineered cement, (iii) decreasing water demand, (iv) increasing nucleation, (v) optimizing heat of hydration; and (vi) decreasing pore volume.

The PSD of one or more SCM fractions can be defined by the d10, d50 and d90, with the d10 approximating the lower PSD endpoint (LEP), the d90 approximating the upper PSD endpoint (UEP), and the d50 approximating the mean particle size ("MPS"). In other embodiments, one or more of the d1, d5, d15, or intermediate value can be used to approximate LEP, one or more of the d85, d95, d99, or intermediate value to approximate UEP, and one or more of the d40, d45, d55, d60 or intermediate value to approximate MPS. In some cases, the PSD of an ultrafine SCM fraction may be defined mainly or exclusively in terms of the MPS and/or the UEP, while the PSD of a coarse SCM fraction may be defined mainly or exclusively in terms of the MPS and/or the LEP.

Although not required, any portion or all of the SCM fractions described herein may also have a narrow PSD. The narrow PSD SCM fraction can be defined by the UEP to LEP ratio (e.g., d90/d10) where the ratio is for any of the sizes mentioned herein and the ratio is less than or equal to 20, 15, 10, 7.5, 5, 4, 3, or 2.

A. Ultrafine SCM Fraction

Blending one or more ultrafine SCM fraction with a narrow PSD cement can help disperse the finer cement particles, minimize agglomeration, fill fine pore spaces, increase packing density, lower water demand, increase fluidity, and increase strength. The ultrafine fraction is preferably a narrow PSD SCM fraction, which can provide an even pore size and improve the utilization of $C_3S$ by providing the proper proportions of available water and permeability for fully or nearly fully dissolving cement particles.

The UEP of the ultrafine SCM fraction can be selected to be less than, approximately equal to, or greater than the LEP of the narrow PSD cement fraction. In general, the lower the UEP of the ultrafine SCM fraction is relative to the LEP of the cement fraction, the higher is the particle packing density. According to several embodiments of the invention, the degree of overlap can be less than about 25%, 18%, 12%, 8%, or 4% by weight of the combined fractions. In other embodiments, there may be a gap of at least about 5%, 10%, 15%, or 20% between the UEP of the ultrafine SCM and the UEP of the narrow PSD cement.

According to several embodiments, the UEP (e.g., d85, d90, d95 or d99) of an ultrafine SCM can be less than about 18 µm, 15 µm, 12 µm, 10 µm, 9 µm 8 µm, 7 µm, 6 µm, 5 µm, 4.5 µm, 4 µm, 3.5 µm, or 3 µm. In some cases, the lower UEP limit can be about 1 µm, 2 µm or 3 µm. The LEP (e.g., d1, d5, d10 or d15) can be equal to or greater than about 0.01 µm, 0.05 µm, 0.1 µm, 0.5 µm, 1.0 µm, 1.25 µm, 1.5 µm, 1.75 µm, 2 µm, 2.5 µm, 3 µm, 4 µm, or 5 µm. In some cases, the upper LEP limit can be about 8 µm, 6 µm, 5 µm or 4 µm.

The LEP of the ultrafine fraction is generally selected to provide a desired pore size and set time. SCMs with lower LEP may produce faster set times, but may be more costly and produce lower ultimate strength. In one embodiment, the SCM also has a narrow PSD to simultaneously maximize particle packing and decrease pore space. The ratio of UEP and LEP of the ultrafine SCM (i.e., d90/d10) may be less than 20, 15, 10, 7.5, or 5, or 2.5.

To enhance particle packing density of the engineered cement, the MPS of the narrow PSD cement fraction can be at least 3.0 times, 3.25 times, 3.5 times, 4 times, 4.5 times, 5 times, or 6 times the MPS of the ultrafine SCM fraction (e.g., about 3.0-10 times, 3.25-8 times or 3.5-6 times). In some cases, the cement-SCM blend may include one or more coarse SCM fractions that, together with the narrow PSD cement fraction, provide sufficient particle packing density so that the ultrafine SCM fraction may be merely gap graded relative to the cement fraction (e.g., where the MPS of the cement fraction is less than 3.0 times, 2.8 times, 2.7 times, 2.6 times, or 2.5 times the MPS of the ultrafine SCM fraction).

B. Coarse SCM Fraction

Blending a coarse SCM fraction with a narrow PSD cement clinker fraction can greatly increase particle packing, providing a filling effect using a less expensive component, lower the w/cm, increase fluidity, and increase strength.

The LEP of the coarse SCM fraction can be selected to be less than, approximately equal to, or greater than the UEP of the narrow PSD cement fraction. In general, the higher the LEP of the coarse SCM fraction is relative to the UEP of the cement fraction, the higher is the resulting particle packing density. According to several embodiments of the invention, the degree of overlap can be less than about 25%, 18%, 12%, 8%, or 4% by weight of the combined fractions. In other embodiments, there may be a gap of at least about 5%, 10%, 15%, or 20% between the LEP of the coarse SCM and the LEP of the narrow PSD cement.

According to some embodiments, the LEP (e.g., d1, d5, d10 or d15) of a coarse SCM can be equal to or greater than about 8 µm, 10 µm, 12.5 µm, 15 µm, 17.5 µm, 20 µm, 22.5 µm, 25 µm, 30 µm, 35 µm, 40 µm, or 50 µm, with an upper LEP limit of about 30 µm, 40 µm, 50 µm, or 60 µm. The UEP (e.g., d85, d90, d95 or d99) of a coarse SCM can be less than about 250 µm, 200 µm, 175 µm, 150 µm, 125 µm, 110 µm, 100 µm, 90 µm, 85 µm, 80 µm, 75 µm, 70 µm, 65 µm, or 60 µm, with a lower UEP limit of 30 µm, 40 µm, 50 µm, or 60 µm. The foregoing particle sizes can result in a coarse SCM having a surface area less than 600, 500, 475, 450, 425, 400, 375, or 350 $m^2$/kg.

To achieve particle packing relative to the narrow PSD cement, the MPS of the coarse SCM fraction can be at least 3.0 times, 3.25 times, 3.5 times, 4 times, 4.5 times, 5 times, or 6 times the MPS of the narrow PSD cement fraction (e.g., about 3.0-10 times, 3.25-8 times or 3.5-6 times). In some cases, the cement-SCM blend may include an ultrafine SCM fraction and/or a second coarser SCM fraction that, together with the narrow PSD cement fraction, provide sufficient particle packing density that the coarse SCM fraction may be merely gap graded relative to the cement fraction (e.g., where the MPS of the coarse SCM fraction is less than 3.0 times, 2.8 times, 2.7 times, 2.6 times, or 2.5 times the MPS of the narrow PSD cement fraction).

C. Second Coarse SCM

In the case where the engineered cement-SCM blend includes a narrow PSD cement fraction having a relatively low UEP and/or a coarse SCM fraction having a relatively low UEP, it may be desirable to include a second coarse SCM fraction that has a higher MPS than the MPS of the first coarse SCM fraction (e.g., in order to provide additional particle packing relative to the narrow PSD cement fraction and/or fine aggregate in concrete or sand in mortar).

The MPS of the second coarse SCM fraction can differ by a multiple of 3.0 or more relative the MPS of the first coarse SCM fraction (e.g., so as to provide an "ultra-coarse SCM fraction) and/or fine aggregate or sand to maximize particle packing of the overall concrete particle system. Alternatively, the second coarse SCM fraction may be merely gap graded relative to the first coarse SCM fraction and/or fine aggregate or sand (e.g., where the MPS of the second coarse SCM fraction differs by a multiple of less than 3.0. 2.75, 2.5, 2.0, or 1.5 relative to the MPS of the first coarse SCM fraction and/or fine aggregate or sand).

D. Broad PSD SCM

Although narrow PSD SCMs are preferred, the present invention may also be carried out using broad PSD SCMs such as unground fly ash obtained from a power plant (e.g., 1-50 µm). Broad PSD SCMs can broaden the distribution of the engineered SCM, thereby improving particle packing, although not as much as using separate coarse and fine SCMs. However, in some cases the cost savings of a broad PSD SCM may outweigh the benefits of processing the broad SCM to make optimally packed particles. The broad SCM can also be formed from an SCM fraction having the same or similar PSD as the clinker fraction in combination with an ultrafine and/or coarse SCM fraction. An SCM fraction that overlaps may be useful where a fine and/or a coarse SCM fraction provide optimal particle packing density and additional dilution of the clinker fraction is desired.

III. Engineered Cements

The engineered cements of the invention are made by selecting one or more available SCM fractions and engineering a clinker fraction to maximize $C_3S$ utilization when combined with the one or more SCM fractions. According to one embodiment, the engineered cements can be engineered to be "plug and play" so as to approximate 100% OPC in strength development, set time, water demand, and other properties. Such blends can be used as general purpose cement to replace OPC.

Example engineered cements can include at least about 10%, 15%, 20%, 25%, 30%, 35%, 40%, 45%, 50%, 55%, 60%, 65%, or 70% SCM by volume or weight and less than about 90%, 80%, 75%, 70%, 65%, 60%, 55%, 50%, 45%, 40%, 35%, or 30% SCM or within a range of these upper and lower endpoints. Similarly, the engineered clinker fraction may be included in at least 10%, 15%, 20%, 25%, 30%, 35%, 40%, 45%, 50%, 55%, 60%, 65%, or 70% by volume or weight and less than about 90%, 80%, 75%, 70%, 65%, 60%, 55%, 50%, 45%, 40%, 35%, or 30% by volume or weight, or within a range of these upper and lower end points.

Example engineered cement blends can include a distribution of particles spread across a wide range of particle sizes (e.g., over a range of about 0.1-120 µm, or about 0.1-100 µm, or about 0.1-80 µm, or about 0.1-60 µm, or about 0.1-45 µm).

Although not required, the PSD of the clinker fraction may be narrower than the PSD of the SCM fraction. The PSD of the clinker fraction is also coarser than an ultrafine SCM fraction and finer than a coarse SCM fraction. This feature, in combination with the high tricalcium mineral content, achieves the greatest reactivity with the least amount of clinker for a given overall PSD of the engineered blend. In addition, the high tricalcium mineral content can permit higher SCM substitutions with less water demand while still performing similar to 100% OPC.

To achieve desired properties, engineered cements can include binary, ternary, quaternary or even greater numbers of clinker and SCM fractions. The engineered cements preferably include at least an ultrafine cement SCM fraction to provide desired density and pore size to control water demand, sulfate resistance, and set time. The ultrafine SCM can be a non-reactive SCM such as limestone to provide nucleation sites and/or a reactive SCM such as pozzolan or GGBFS to provide added long term strength. In some embodiments, at least two ultrafine SCM fractions can be included where at least one is a non-reactive SCM and the second is a reactive SCM where each of the first and second ultrafine SCMs is independently included in an amount of at least 10%, 15%, 20%, 25%, 30%, 40%, 45%, or 50%.

A coarse SCM can be included to dilute the clinker fraction, increase packing density, and reduce water demand. Typically the coarse SCM is selected to minimize raw material and handling costs. All things being equal, a reactive coarse SCM is preferred for its potential to generate long-term strength. However, less reactive and even non-reactive coarse SCMs can be used to reduce cost.

Engineered cement-SCM blends can have a surface area (e.g., as estimated from the PSD or performing a Blaine test) and/or PSD (e.g., as described by the Rosin-Rammler-Sperling-Bennet distribution) that approximates that of OPC. For example, the engineered cement can have an overall surface area greater than 250, 280, 300, 325, or 350 $m^2$/kg or less than 700, 600, 500, or 400 $m^2$/kg, or within a range of the foregoing surface areas.

Example engineered hydraulic cement blends can substitute for OPC in conventional concrete, including Types I, II, III, VI and V cements. They can have set times, strength development characteristics and other performance characteristics that fall within the ranges of ASTM C-150 in order to serve as a substitute for Type I, Type II, Type III, Type IV or Type V cement in the ready mix industry. The initial set time can greater than 30, 45, 60 or 90 minutes and less than 500, 400, 350, or 250 minutes or within a range of the foregoing upper and lower set times.

The engineered cements of the invention can be engineered to generate a desired amount of heat. An engineered cement with high SCM substitution and a desired heat of hydration can be produced by producing an engineered hydraulic cement with a desired $C_3A$ and $C_3S$ content and PSD and blending it with the desired amount of SCM. In one embodiment, the engineered cement and SCM are selected to produce an engineered cement with a 7 day heat of hydration (as measured using ASTM C186) of at least 255, 275, 295, 315 kJ/kg and less than 450, 400, 350, 290, or 250 kJ/kg, or a range of the foregoing upper and lower heats of hydration.

Engineering the heat of hydration using an SCM fraction and clinker fraction can be easily accomplished by adjusting the relative ratios of SCM fraction to clinker fraction. The optimal amount will vary widely depending on the SCM, clinker, and desired use of the cement (e.g., thick slab vs. thin slab concrete).

A significant advantage of the engineered cements of the present invention is that the clinker fraction can be optimized for use with SCMs that are generally not suitable for use in high quality SCM-OPC blends. Unlike blended cements used conventionally, engineered cements of the invention can be engineered to overcome deficits of some SCMs that diminish their value in making blended cements. These sources of SCM can be substantially cheaper and often more plentiful than higher quality SCMs that fall within the ASTM standards for making blended cements such as ASTM C-595 cements.

The engineered cement can be designed for reactive SCMs that include $C_3A$ or other reactive aluminates. For example, SCMs such as Class C fly ash can include significant quantities of $C_3A$ or other reactive aluminates. In these embodiments, the sulfate resistance of the engineered cement can be designed by adding in the vol % of $C_3A$ or other reactive aluminates contributed by the SCM and including only an amount of $C_3A$ in the engineered clinker fraction that does not cause the engineered cement to exceed $C_3A$ limits for a moderate or high sulfate resistant material.

The engineered cements of the invention include sulfate (e.g., gypsum). Sulfate content can be selected to optimize strength and setting of the engineered cement as opposed to setting of the clinker fraction alone (as is typical for OPC). The sulfate may be inter-ground with the clinker fraction or an SCM fraction, or ground separately. If ground apart from the clinker, the $SO_3$ may be blended with the clinker fraction and/or SCM fraction on-site, off-site, and/or in any order. Those skilled in the art are familiar with the techniques for optimizing $SO_3$.

To ensure the clinker and SCM fractions and/or the engineered cement have a PSD within desired parameters, care should be taken to accurately determine particle size. The particle size of perfectly spherical particles can be measured by diameter. While fly ash is generally spherical owing to how it is formed, Portland cement clinker and some SCMs can be non spherical (i. e., when ground from larger particles). For these, "particle size" can be determined according to accepted methods for determining particle sizes of ground or otherwise non spherical materials. Particle size can be measured by any acceptable method and/or methods yet to be developed. Examples include sieving, optical or electron microscope analysis, laser diffraction, x-ray diffraction, sedimentation, elutriation, microscope counting, Coulter counter, and Dynamic Light Scattering.

The $C_3A$, $C_3S$, and $C_4AF$ content of the cement fraction may be calculated using standard techniques used in the cement industry. For example, $C_3A$, $C_3S$, and $C_4AF$ may be calculated using the bogue equation or X-ray fluorescence to determine the calculated or actual chemical composition of the cement. Techniques for calculating the mineral content in cement are well-known and can be found in ASTM C150-10, C114-10, and related ASTM publications available in 2010. Techniques for calculating mineral content using X-ray diffraction are also known.

As is customary in the art, the content of the mineral phases can be provided as a weight percent of the finished cement. For purposes of the invention, the percentage of the chemical content of the "engineered cement" refers to the mineral content as a weight percentage of the combined clinker and SCM fractions. For purposes of the invention, the percentage of the chemical content of the "cement fraction" or "clinker material," or "clinker fraction" refers to the mineral content as a weight percent of cement clinker (i.e., without added sulfate, limestone, grinding aid, etc.).

IV. Making and Distributing Engineered Cements

The engineered cements of the invention are manufactured by properly engineering the clinker fraction in terms of chemistry and PSD alone or in combination with the chemistry and/or PSD of the SCM fraction and combining the materials together in an amount that achieves an engineered cement that performs similar to or better than ordinary Portland cement.

Those skilled in the art are familiar with techniques for changing the content of $C_3S$ and $C_3A$ in a clinker material. In general, for a given limestone (source of lime) and clay or shale (source of silica and alumina), increasing the percentage of limestone relative to clay or shale in the kiln increases the amount of $C_3S$ by increasing the ratio of $C_3S$ to $C_2S$ but decreases the $C_3A$ content. To increase the $C_3A$, it may be desirable to use a clay or shale having higher alumina content and/or supplement the feed with an aluminum rich material, such as bauxite. Beyond a certain point, adding more limestone may not further increase $C_3S$ content but yield free lime, which is generally undesirable. A flux may be necessary to convert excess free lime into $C_3S$. In one embodiment, the flux may be a fluoride flux such as, but not limited to $CaF_2$.

The increased $C_3A$, increased $C_3S$, and/or reduced particle size of the engineered cement fraction can offset a dearth or lack of $C_3A$ and/or $C_3S$ in the SCM fraction. By engineering the clinker fraction to perform with the SCM, the performance of the engineered cements of the invention can meet or exceed the performance criteria of ASTM 1157-10 (as published in 2010), which is hereby incorporated herein by reference.

Although not require, the combining of the engineered hydraulic cement and SCM fraction advantageously occurs in dry form prior to mixing with water and may occur prior to being distributed to users (e.g., prior to delivery to a concrete manufacturer). Although not required, the clinker and SCM fractions are typically generated in separate processes. Pre-blending in dry form allows intimate mixing of the engineered cement and SCM fractions and tighter control over the composition and performance of the overall blend. In other embodiments, blending of the engineered clinker and SCM fractions occurs with water and/or at a ready mix batch plant, precast facility, or other on-site location operated by an end user of cement.

Importantly, blending or distribution of the SCM and clinker fractions by a cement producer allows the cement producer to implement blending control measures and/or quality control measures that may not be possible in wet concrete and/or are not possible or practical for end users to monitor or control. These quality control measures can ensure proper chemical and/or physical properties of the engineered cement over time, which allows non-technical or untrained individuals to achieve consistent performance when using the engineered cements.

As discussed above, in some embodiments the engineered cement may include two or more different clinker fractions. The first and second clinker fractions may be manufactured in the same cement plant or different cement plants and/or the same kiln or different kilns. The two or more cements can be blended together at a cement plant or, alternatively, at an offsite blending facility. The two or more cements may be blended together simultaneously with the SCM or may be pre-blended before being blended with the SCM. The engineered cements having two or more different cements may also be blended with aggregates in the dry form to produce a bagged concrete and/or may be mixed with water and aggregates to form a wet cementitious material.

To ensure proper physical and chemical properties, the method can include measuring the chemical and/or physical properties of the engineered cement, the SCM, the engineered blend, or a combination of these.

Examples of suitable chemical properties that can be measured include, but are not limited to, the content of $SiO_2$, $Al_2O_3$, $Fe_2O_3$, CaO, MgO, $SO_3$, Ignition Loss, $Na_2O$, $K_2O$, Insoluble residue, $CO_2$, $C_3S$, $C_2S$, $C_3A$, $C_4AF$, $C_4AF+2$ $(C_3A)$, $C_3A+C_3S$, or combinations of these. The chemical constituents can be measured using wet chemistry techniques or dry chemistry techniques known in the art or a combination of these. Examples of suitable techniques include XRay fluorescence and XRD. Any standards known in the art for testing the chemical composition of a cement and/or pozzolan can be used in the methods of the invention.

The methods of the invention preferably include measuring and/or calculating one or more different chemical properties and controlling the manufacture of the engineered Portland cement and/or SCM and/or the blending of the engineered Portland cement and SCM to ensure that the one or more chemical properties have a chemical composition that remains within an acceptable limit. In a preferred embodiment, the monitored chemical composition is controlled such that the deviation of its weight or volume % over time is less than 20%, more preferably less than 5% and most preferably less than 1%. For example, quality control measurements can be taken hourly, daily, or weekly, and variation throughout days, weeks, or months of the chemical composition can be held within selected quality control parameters. In a preferred embodiment, this quality control (i.e., maintaining the chemical composition within selected quality control parameters) is carried out for at least 2, at least 3, at least 4, or even at least 5 different chemical properties. Particularly useful chemical properties that can be monitored and held within a quality control parameter can include $C_3A$, $C_3S$, free CaO, alkali, ignition loss, and sulfate. Where sulfate is controlled, the sulfate may be monitored using calorimetry and/or by performing strength tests to determine a desired amount of sulfate that optimizes strength development.

In some embodiments, the chemical content of one or more chemical properties is measured and controlled even though the engineered cement is to be sold under a standard that does not require the measurement or reporting of the one or more chemical properties. For example when producing an engineered cement under ASTM C-1157, the chemical properties related to $C_3A$, $C_3S$, and/or alkali content, may be measured and controlled. In a preferred embodiment, 2, 3, 4, or 5 chemical properties are monitored and controlled for quality control assurances where calculating and/or reporting of the chemical properties is not required for qualifying under the standard for which the cement is being marketed.

In addition, the engineered cement can be analyzed to determine physical properties. Suitable physical properties include, but are not limited to, air content of mortar, Blaine fineness, surface area, autoclave expansion, compressive strength, set time, false set, heat of hydration, density, or combinations of these. Suitable methods for determining the performance of these properties are known in the art and include techniques such as mortar cube tests, Vicat tests, particle size analyzers, sieves, flow tables, Blaine apparatus, calorimeter, ovens, scale, and equipment known in the art.

Suitable standards for determining the chemical composition or physical properties of the engineered cement blends include, but are not limited to, any portion of the ASTM standards (e.g. ASTM C150-10, ASTM C114-10, ASTM C595-10, ASTM C1157) or European standards published in 2010, including EN 197 (cement) and EN 450 (fly ash) or any of the standards implemented in any of the forgoing standards, all of which are incorporated herein by reference.

In one embodiment, the present invention relates to making an engineered cement in which the SCM is provided as a stream that varies in one or more chemical properties and/or one or more physical properties over time (e.g., varies within days, weeks, or months). The methods of the invention include measuring the variation in the chemical or physical property and adjusting the chemical or physical property of the engineered cement to reduce the variation of a chemical or physical property of the engineered cement over time. Examples of methods and systems for reducing variation in engineered cements are disclosed in WO 2011/103371, published Aug. 25, 2011, which is incorporated by reference. Any of the methods disclosed in the foregoing application can be used in combination with any of the compositions or methods disclosed herein or incorporated herein by reference.

Another aspect of the invention relates to reporting the physical or chemical properties or average measurements of the physical or chemical properties of the engineered cement to an end user, such as but not limited to, a concrete manufacturer. For example, the end user can be provided with a quality control report or "mill sheet". In a preferred embodiment, at least a portion of the measurements are obtained from test performed on the engineered blend (i.e., not the hydraulic cement fraction and SCM fractions separately). Although not required, measuring the chemical and/or physical properties of the blended material ensures that the measured properties are more similar to the properties in the actual material delivered to the end user, which is particularly important for non-technical users. One physical property that can be calculated and provided to the concrete manufacturers is the density of the engineered cement or a density correction factor that compares the density of the engineered cement to that of OPC, which has a density of 3.15.

In one embodiment, a method includes providing an engineered Portland cement that has greater than 5.5% $C_3A$ and the vol % of the reactive SCM is selected to give the engineered cement a six month sulfate expansion of less than 0.05% as measured using ASTM C1012-10, which is an indication that the engineered cement is highly resistant to sulfate attack. In another embodiment, a method includes providing an engineered Portland cement that has greater than 8.5% $C_3A$ and the vol % of reactive SCM is selected to give the engineered cement a six month sulfate expansion of less than 0.10% as measured using ASTM C1012-10, thereby indicating moderate sulfate resistance. The methods can also include informing at least a portion of the concrete manufacturers or other users that the engineered cement is resistant to sulfate attack, including moderate resistance or high resistance.

In other methods of the invention, a cement plant and/or blending facility can be operated in a manner that induces the use of engineered cement so as to reduce carbon dioxide emissions and/or cost. In one embodiment, a method for making engineered cement as described herein uses a large quantity of a local supply of a SCM and imported hydraulic cement. The imported hydraulic cement is engineered cement to be blended with the local SCM in high quantities. For purposes of this invention, the term "imported" refers to geographic areas, not necessarily political boundaries.

A significant impediment to using high volume replacement of SCMs in concrete is that cement is locally produced and the cement industry over the last few decades has gradually migrated toward producing only one type of clinker, and in many cases only one type of cement. Moreover, in the concrete industry, there are certain users of cement that require a traditional type of cement made from 100% clinker and gypsum. For example, some governments have departments of transportation that specify that certain government project be made from a certain type of cement. This type of regulatory requirement is critical when constructing massive bridges and high rise buildings, for example. Because of the need for cements with 100% clinker in certain projects and because the industry usually produces a "one-size-fits-all" cement, the cement available in many local markets is difficult to blend with local SCMs in high quantities while still maintaining good performance. As a consequence, the use of SCMs is generally limited to highly skilled concrete manufacturers who can engineer the concrete (not the cement) to achieve good performance.

Imported cements provide opportunities to make superior engineered cements. However, the emissions and cost generated from shipping conventional cements over long distances can offset most or all of the reduced emissions generated from substitution with an SCM and make the engineered cement cost prohibitive.

The methods of the present invention overcome the problems in the industry by engineering a distant source of cement for blending with a local SCM. When used with a local SCM, the engineered imported cement can be used in lower quantities in concrete than conventional Portland cement materials when blended with the local SCM. Thus, tailoring the distant source of cement for a local SCM source reduces the total shipping requirements per ton of engineered cement. The reduction in emissions and/or reduced cost from using less of the engineered cement can outweigh the emissions and/or costs from shipping the cement from the distant source, thereby producing a net reduction in carbon dioxide emissions and/or cost.

The hydraulic cements of the invention can be engineered with respect to particle size, $C_3S$, $C_3A$, and/or sulfate to provide increased reactivity, decreased water demand, and/or proper set time when combined with the local SCMs as compared to locally available conventional cements.

In one embodiment, an example for carrying out a method for making a engineered cement includes all or a portion of the following steps. Step (i) providing one or more SCM fractions in a first location; step (ii) manufacturing a clinker at a cement plant in a second location; step (iii) milling the clinker to form an engineered clinker fraction as described herein; (iv) importing the clinker or engineered cement fraction from the second location to a distribution terminal in the first location, where the distribution terminal is located at least 200, 300, 500, or 1000 miles from the cement manufacturing plant; step (v) distributing the imported hydraulic cement to a plurality of concrete manufactures and/or concrete manufacturing facilities; and step (vi) blending the imported engineered cement fraction with the local SCM to form an engineered cement. The blending of the SCM and cement fraction can be carried out before or after distribution and the milling of the clinker can be performed before or after importing.

In the foregoing embodiments, the engineered cement may include greater than 25 vol %, preferably greater than 30 vol %, 35 vol %, or 40 vol % of the local SCM. With higher percentages of substitution it is generally desirable to have increasing concentrations of tricalcium minerals and/or decreasing hydraulic cement fineness as discussed herein.

Any of the foregoing methods can be used in any combination with the foregoing engineered cements and/or engineered cements.

V. Manufacturing Narrow PSD Materials

Exemplary methods for manufacturing engineered hydraulic cements include comminuting, classifying, and/or modifying the chemistry of the cement clinker to have a desired PSD, desired chemical composition, and/or a desired consistency in chemical properties and/or particle size. Online detectors, such as online particle size analyzers and/or an online chemical analyzers can be used. A control module running computer executable instructions can be configured to receive a series of readings from the online detector and control one or more components of the hydraulic cement manufacturing system to achieve a desired distribution of hydraulic cement particles and/or a desired chemical characteristic.

The narrow PSD clinker and/or SCM fractions are produced using a grinding mill and one or more high efficiency classifiers configured to produce a narrow particle size distribution. The grinding mill may be a high-pressure vertical roller mill or horizontal mill, or a ball mill.

The grinding may employ the use of two or more classification steps in series to achieve the desired narrow PSD. The coarse fractions from the two or more classification steps can be returned to the grinding mill or ground in a separate grinder to achieve the desired particle size distribution for the clinker material. In a preferred embodiment, the mill is a vertical roller mill ("VRM"). In a VRM, the clinker feed is subjected to compression fracturing under a high pressure roller to produce an intermediate ground material having a lower end particle size that is at or above the desired LEP. The intermediate material is classified first in an upflow air stream that suspends intermediate fine particles of a desired size and delivers the intermediate fines to a high efficiency separator. In a second classification step, the high efficiency separator produces a coarse fraction, which is recirculated back to the rollers for additional grinding, and a narrow PSD fine fraction that is collected as the narrow PSD product. To obtain even narrower PSDs, additional classifiers in series can be used to further fractionate the fine fraction until the desired distribution is achieved while each coarse fraction is returned for additional grinding. The narrow PSD material (either clinker or SCM) can be blended to make an engineered cement as described herein.

The upper end point of the narrow PSD fraction (e.g., d90) can be achieved by configuring the classifier producing the product (e.g., where a series of classifiers are used, this would typically be the last classifier) to make a top cut at the desired upper end point. This can be accomplished, for example by selecting a proper separator rotation speed. The lower end point (e.g., d5) is selected by producing an intermediate clinker material that includes the particles of the desired finished product comingled with only coarser particles. This property can be achieved by avoiding over-grinding. Over-grinding can be avoided by decreasing the grinding pressure and/or reducing the grinding time before classification.

VI. Cementitious Compositions

Engineered cements and narrow PSD clinker fractions can be used to make wet and dry concrete mixes, mortar, grout, molding compositions, oil well cements, or other cementitious compositions. "Concrete" refers to cementitious compositions that include cement binder and aggregate, such as fine and coarse aggregates. "Mortar" typically includes cement, sand, and lime and can be sufficiently stiff to support the weight of a brick or concrete block. "Grout" is used to fill in spaces, such as cracks or crevices in concrete structures, spaces between structural objects, and spaces between tiles. "Molding compositions" are used to manufacture molded or precast objects, such as slabs, pots, troughs, posts, fountains, ornamental stone, and the like.

Cementitious compositions of the invention can include engineered cement as described herein (i.e., including a clinker fraction and a SCM fraction), water, and aggregate (e.g., sand and/or rock). Other components include optional admixtures, including but not limited to, accelerating agents, retarding agents, plasticizers, water reducers, water binders, and the like, and fillers, such as ground limestone.

Cementitious compositions can be dry blended prior to adding water, or they may be prepared in situ within a freshly mixed cementitious composition that includes water. Embodiments of the invention include bagged dry concrete mixes that include aggregates and any of the engineered cements described herein. The present invention, while applicable to ready mix and any other type of concrete manufacturing, can be particularly advantageous for bagged concrete since this concrete typically is not engineered by the person or company that makes the wet mix. By engineering the cement fraction to work well with an SCM, the bagged concretes can be mixed by non-technical users and achieve early strengths and set times typical of OPC.

In another embodiment, the present invention includes a concrete mix that includes water, aggregate and any of the engineered cements described herein, wherein the water to cement ratio (based on weight) is greater than 0.3, 0.325, 0.35, 0.375, 0.40, 0.425, or 0.45. By engineering the cement fraction to be highly reactive, the engineered cements described herein can be used with relatively high water to cement ratios and the addition of water at the job site to increase flow can have minimal impact on early strength development and set times.

The cementitious compositions are suitable for use in a variety of environments including ambient environments that are cold or warm. Wet cementitious material can be placed in a cold ambient environment with a temperature less than 60° F. or less than 32° F. and allowed to cure at ambient temperature (i.e., exposed to the ambient temperature). In other embodiments the wet cementitious material may be placed in an environment that is relatively warm. The cementitious material may be placed in an environment with an ambient temperature greater than 60° F. or 70° F. and allowed to cure at the ambient temperature (i.e., exposed to the ambient temperature).

VII. Examples

The following examples illustrate embodiments of the invention using engineered clinker fractions that are designed for use with an SCM to make engineered cements. Examples in present tense are hypothetical in nature but illustrative of embodiments within the scope of the invention.

Examples 1-36

Example 1 illustrates a highly reactive cement fraction engineered for use with one or more SCMs. The engineered cement is made from raw clinker material with 50% $C_3S$ by weight. The raw clinker is ground in a high pressure roller mill (e.g., vertical roller mill) to form an intermediate clinker having a d5 substantially greater than 2 µm. The intermediate ground material is classified a first time to produce a first coarse fraction and an intermediate fine fraction, where the intermediate fine fraction also has a d5 substantially greater than 2 µm. The intermediate fines are classified a second time to produce a second coarse fraction and a narrow PSD cement with a d90 of 35 µm or less and a d5 of 2 µm or greater. The d90 is achieved by configuring a high efficiency classifier to separate the intermediate fines with a cut size at a d90 of 35 µm or less (e.g., for example by selecting a proper separator rotation speed). The d5 is selected by producing an intermediate clinker material that is sufficiently coarse to undergo the first and second classification steps and yield the desired d5. This can be achieved by avoiding over-grinding. Over-grinding can be avoided by decreasing the grinding pressure and/or reducing the grinding time before classification.

Examples 2-6 are the same as Example 1 except that the classifier for the intermediate fines is configured to produce a narrow PSD clinker fraction with a d90 equal to or less than 30 µm, 25 µm, 20 µm, and 15 µm, respectively. Examples 7-36 are the same as Examples 1-6, except that the grinding pressure and/or grinding time of the mill is configured to produce an intermediate material that yields a narrow PSD clinker fraction having a d5 equal to or greater than 2.5 µm, 3 µm, 4 µm, 5 µm, 7.5 µm, and 10 µm, respectively.

Examples 37-262

Examples 37-72, 73-108, 109-144, 155-190, 191-226, and 227-262 are each the same as examples 1-36, respectively except that the raw clinker material used to make the engineered ground clinker has a $C_3S$ content equal to or greater than 55%, 59%, 62%, 65%, 70%, and 75%, respectively.

The foregoing elements and embodiments described herein can be used in any combination to produce clinker fractions, SCM fractions, engineered cements, and for making, distributing, and using the engineered cements and engineered fractions in the manufacture and use of concrete and other cementitious materials.

Examples 263-270

One or more narrow PSD engineered clinkers from any of the foregoing examples is blended with one or more SCMs to make engineered blended cements. The Exemplary blended cements can include any reactive or non-reactive SCM described herein or known in the art. The blended cements in Examples 263-270 have the following characteristics (x=particle size in µm).

|  | Mean Particle Size (MPS) | | | | | |
|---|---|---|---|---|---|---|
| Example | SCM-1 | SCM-2 | Clinker-1 | Clinker-2 | SCM-3 | SCM-4 |
| 263 | ≤x/3 | — | x | — | ≥3x | — |
| 264 | ≤x/3 | ≤x/3 | x | — | ≥3x | — |
| 265 | ≤x/3 | — | x | — | ≥3x | ≥3x |
| 266 | ≤x/3 | — | x | x | ≥3x | — |
| 267 | ≤x/3 | ≤x/3 | x | x | ≥3x | ≥3x |
| 268 | ≤x/9 | ≤x/3 | x | — | ≥3x | — |
| 269 | ≤x/3 | — | x | — | ≥3x | ≥9x |
| 270 | ≤x/3 | ≤x/2 | x | 1.5x | ≥3x | ≥6x |

Examples 271-280

Any of Examples 263-270 is modified to decrease the difference(s) in MPS between at least two of the components by 5%, 10%, 15%, 20%, 25%, 30%, 35%, and 40%, 45%, and 50%, respectively.

Examples 281-290

Any of Examples 263-270 is modified to increase the difference(s) in MPS between at least two of the components by 5%, 10%, 15%, 20%, 25%, 30%, 35%, and 40%, 45%, and 50%, respectively.

Examples 291-300

Any of Examples 263-270 is modified to increase the difference in MPS between two of the components by 5%, 10%, 15%, 20%, 25%, 30%, 35%, and 40%, 45%, and 50%, respectively and decrease the difference in MPS between two other of the components by 5%, 10%, 15%, 20%, 25%, 30%, 35%, and 40%, 45%, and 50%, respectively.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. We claim:

The invention claimed is:

1. A method for manufacturing a dry blended engineered hydraulic cement, comprising:
   manufacturing cement clinker at a cement plant;
   milling the cement clinker to form a cement fraction, the cement clinker and/or the cement fraction having at least one high reactivity characteristic selected from:
   (i) the cement clinker including at least 67% by weight tricalcium silicate ($C_3S$) and at least 4.5% by weight tricalcium aluminate ($C_3A$);
   (ii) the cement clinker including at least 57% by weight tricalcium silicate ($C_3S$) and at least 8.5% by weight tricalcium aluminate ($C_3A$);
   (iii) the cement clinker including at least 73.5% by weight of combined tricalcium silicate ($C_3S$) and tricalcium aluminate ($C_3A$), or
   (iv) the cement fraction having a d85 less than about 35 µm; and
   blending, without intergrinding, the cement fraction with a coarse supplementary cementitious material (SCM) fraction to form a dry blended engineered hydraulic cement having an SCM content of at least about 30% by weight, the coarse SCM fraction having a d90 of at least 40 µm and a d50 greater than a d50 of the cement fraction.

2. The method as in claim 1, wherein the cement clinker is milled at a location that is at least 200 miles from the cement plant.

3. A method as in claim 1, further comprising:
   manufacturing a second cement clinker at a second cement plant, the second cement clinker having a tricalcium silicate content and/or a tricalcium aluminate content that differs from the tricalcium silicate content and/or the tricalcium aluminate content of the cement clinker manufactured at the cement plant;
   milling the second cement clinker to form a second cement fraction; and
   blending the second cement fraction with at least one of the cement fraction or the coarse SCM fraction.

4. A method as in claim 1, further comprising:
   periodically sampling the engineered hydraulic cement and measuring at least one chemical property and/or at least one physical property; and
   distributing portions of the engineered hydraulic cement to a plurality of different concrete manufacturers and providing the at least one chemical property and/or at least one physical property to the plurality of concrete manufacturers.

5. The method as in claim 4, comprising measuring at least one physical property selected from the group consisting of air content of mortar, Blaine fineness, particle size distribution of the hydraulic cement fraction, particle size distribution of the coarse SCM fraction, surface area, autoclave expansion, compressive strength, set time, false set, heat of hydration, and density.

6. The method as in claim 4, comprising measuring at least one chemical property selected from the group consisting of $SiO_2$, $Al_2O_3$, $Fe_2O_3$, CaO, MgO, $SO_3$, ignition loss, $Na_2O$, $K_2O$, insoluble residue, $CO_2$, $C_3S$, $C_2S$, $C_3A$, $C_4AF$, $C_4AF+2(C_3A)$, and $C_3A+C_3S$.

7. The method as in claim 6, wherein the at least one chemical property is measured using an online chemical analyzer.

8. A method for manufacturing a dry blended engineered hydraulic cement, comprising:
   (i) manufacturing a Portland cement clinker at a cement plant;
   (ii) milling the Portland cement clinker at a milling facility to form at least a portion of a cement fraction;
   (iii) importing the Portland cement clinker from the cement plant and/or the cement fraction from the milling facility to a terminal located at least 200 miles from the cement plant and/or the milling facility;
   (iv) blending, without intergrinding, the cement fraction with a coarse supplementary cementitious material (SCM) fraction to form a dry blended engineered hydraulic cement having an SCM content of at least about 30% by weight, the coarse SCM fraction having a d90 of at least 40 µm and a d50 greater than a d50 of the cement fraction, the cement fraction and coarse SCM fraction each having a particle size distribution (PSD) so that the dry blended engineered hydraulic cement has a broader PSD than the PSD of the cement fraction by itself; and
   (v) distributing the dry blended engineered hydraulic cement to a plurality of concrete manufacturing plants at different locations.

9. The method as in claim 8, wherein (iv) occurs at a blending facility, the method further comprising importing the coarse SCM fraction to the blending facility from a different location.

10. The method as in claim 1, the cement clinker having a $C_3S$ content of at least 70%.

11. The method as in claim 1, the cement clinker having a $C_3S$ content of at least 75%.

12. The method as in claim 1, the cement clinker having combined tricalcium silicate ($C_3S$) and tricalcium aluminate ($C_3A$) content of at least 75%.

13. The method as in claim 1, the cement clinker having combined tricalcium silicate ($C_3S$) and tricalcium aluminate ($C_3A$) content of at least 81%.

14. The method as in claim 1, wherein the dry blended engineered hydraulic cement is a binary blend comprising the cement fraction and the coarse SCM fraction, the cement fraction having a d90 in a range of 5 µm to 35 µm and the coarse SCM fraction having an average particle size greater than an average particle size of the cement fraction.

15. The method as in claim 1, wherein the dry blended engineered hydraulic cement is a ternary blend comprising the cement fraction, the coarse SCM fraction, and an ultrafine SCM fraction with a d50 less than a d50 of the cement fraction.

16. The method as in claim 1, the cement fraction having a d10 greater than 1 μm and a d90 greater than 10 μm and up to about 35 μm.

17. A method for manufacturing a dry blended engineered hydraulic cement formulated for use in making concrete, comprising:
  receiving, by a concrete plant at a first location, a cement clinker manufactured at a cement plant at a second location and milling the cement clinker at the first location to form a cement fraction and/or receiving a cement fraction at the first location milled from the cement clinker, the cement clinker and/or the cement fraction having at least one high reactivity characteristic selected from:
    (i) the cement clinker including at least 61% by weight tricalcium silicate ($C_3S$) and at least 4.5% by weight tricalcium aluminate ($C_3A$);
    (ii) the cement clinker including at least 57% by weight tricalcium silicate ($C_3S$) and at least 5.5% by weight tricalcium aluminate ($C_3A$);
    (iii) the cement clinker including at least 73.5% by weight of combined tricalcium silicate ($C_3S$) and tricalcium aluminate ($C_3A$), or
    (iv) the cement fraction having a d85 less than about 35 μm;
  receiving, by the concrete plant, a supplementary cementitious material (SCM) and further processing the SCM into one or more SCM fractions and/or receiving one or more SCM fractions and optionally further processing the one or more SCM fractions, the one or more SCM fractions including a coarse SCM fraction having a d90 of at least 40 μm and a d50 greater than a d50 of the cement fraction;
  blending, at the concrete plant and without intergrinding, the cement fraction with the coarse SCM fraction to form a dry blended engineered hydraulic cement having an SCM content of at least about 30% by weight, the cement fraction and the coarse SCM fraction each having a particle size distribution (PSD) so that the dry blended engineered hydraulic cement has a broader PSD than the PSD of the cement fraction by itself; and
  storing the dry blended engineered hydraulic cement at the concrete plant for later use.

18. A method of manufacturing a cementitious composition comprising blending the dry blended engineered hydraulic cement of claim 17 with at least one of water, aggregate, or chemical admixture to form a cementitious composition.

19. The method as in claim 17, further comprising blending an additional SCM with the cementitious composition.

* * * * *